United States Patent [19]

Aggarwal et al.

[11] 4,339,173

[45] Jul. 13, 1982

[54] OPTICAL WAVEGUIDE CONTAINING $P_2O_5$ AND $GeO_2$

[75] Inventors: Ishwar D. Aggarwal, Northboro, Mass.; Eric N. Randall, Cheshire, Conn.

[73] Assignee: Corning Glass Works, Corning, N.Y.

[21] Appl. No.: 611,226

[22] Filed: Sep. 8, 1975

[51] Int. Cl.³ .............................................. G02B 5/172
[52] U.S. Cl. ............................... 350/96.30; 350/96.31; 350/96.34
[58] Field of Search .............................. 106/47 Q, 50; 65/DIG. 7; 350/175 GN, 96 GN, 96.29, 96.30, 96.31, 96.34, 96 WG

[56] References Cited

U.S. PATENT DOCUMENTS 3,938,974  2/1976  Macedo et al. ............ 350/96 WG X

OTHER PUBLICATIONS

MacChesney, J. B., O'Connor, P. B., Presby, H. M., "A New Technique for the Preparation of Low-Loss...", Proce. of the IEEE, Sep. 1974, pp. 1280-1281.

Payne, D. N., W. A. Gambling, New Silica-based Low Loss Optical Fibre, Elec. Lett., vol. 10, No. 15, Jul. 25, 1974, pp. 289-290.

*Primary Examiner*—John D. Lee
*Attorney, Agent, or Firm*—William J. Simmons, Jr.

[57] ABSTRACT

An optical waveguide having a cladding of high purity glass and a core of high purity glass doped with an amount of $P_2O_5$ and $GeO_2$ to increase the refractive index thereof to a predetermined level. The ratio of $P_2O_5$ to $GeO_2$ is such that the softening point temperature of the core is compatible with that of the cladding. The core glass has a cation impurity level not exceeding 10 parts per million.

18 Claims, 6 Drawing Figures

OPTICAL WAVEGUIDE CONTAINING P$_2$O$_5$ AND GEO$_2$

BACKGROUND OF THE INVENTION

High capacity communication systems operating around $10^{15}$ Hz are needed to accommodate future increases in communication traffic. These systems are referred to as optical communication systems since $10^{15}$ Hz is within the frequency spectrum of light. Optical waveguides, which are the most promising medium for transmission at such frequencies, normally consist of an optical fiber having a transparent core having a refractive index $n_1$ surrounded by transparent cladding material having a refractive index $n_2$ which is less than $n_1$.

It has been known for some time that light can be propagated along a transparent fiber structure having a refractive index that is greater than that of its surroundings, and clad fibers have been employed to transmit light over relatively short distances. The numerical aperture (NA) of such a fiber, which is a measure of the light gathering ability thereof, can be approximated by:

$$NA = \sqrt{2n\Delta} \qquad (1)$$

where n is the average refractive index of the core and cladding and $\Delta$ is the refractive index difference between the core and cladding. In conventional optical fibers $\Delta$ is made quite large so that the NA is large, and therefore the fiber is capable of gathering a relatively large amount of light emitted by a source.

The stringent optical requirements placed on the transmission medium to be employed in optical communication systems has negated the use of conventional glass fiber optics, since attenuation therein due to both scattering and impurity absorption is much too high. Thus, unique methods had to be developed for preparing very high purity glasses in fiber optic form. Various methods employing the flame hydrolysis technique for forming glass optical waveguide fibers are taught in U.S. Pat. Nos. 3,711,262; 3,737,292; 3,737,293 and 3,826,560, the latter patent being directed to the formation of gradient index fibers. In accordance with one embodiment of the flame hydrolysis process a plurality of constituents in vapor form are entrained in a gaseous medium in predetermined amounts and thereafter are oxidized in a flame to form a soot having a predetermined composition. The soot is applied to the surface of a rotating cylindrical starting member. After a first layer of soot is deposited to form the core glass, the composition of the soot is changed to form the cladding glass. Heretofore, the soot was either sintered as deposited, or it was sintered in a subsequent operation. After the starting member is removed, the resulting cylindrical hollow redraw blank is heated to a temperature at which the material has a low enough viscosity for drawing and is drawn to reduce the diameter thereof until the inner walls of the hollow member collapse. Continued drawing further reduces the fiber diameter until an optical waveguide fiber having the desired dimensions is formed. In accordance with another embodiment of the flame hydrolysis process the soot is deposited on the inner surface of a glass tube, and the resultant structure is drawn into a fiber.

The value of $\Delta$ has been maintained relatively small in optical waveguides for a number of reasons. The cladding of low loss optical waveguides has usually been formed of a high purity glass such as silica, whereas the core has been formed of the same high purity glass to which a sufficient amount of dopant material has been added to increase the refractive index of the core to a value greater than that of the cladding. Optical waveguides initially formed by the flame hydrolysis process employed multivalent metal oxides such as titanium oxide, tantalum oxide and the like as the dopant material. An inherent problem of such waveguides was the limitation of dopant material to no more than about 15 wt.%. Although fused silica has excellent light transmission qualities in that absorption and intrinsic scattering of light thereby is exceptionally low, the addition of an excessive amount of the aforementioned multivalent metal oxide dopant material to increase the refractive index would cause absorption of light energy and intrinsic scattering of light to increase to undesirable levels.

Pure germania also has excellent light transmission qualities in that its absorption and intrinsic scattering of light is exceptionally low. Moreover, the refractive index of germania is sufficiently greater than that of silica so that germania can be employed as a dopant to increase the refractive index of silica. Initial attempts to utilize the flame hydrolysis process to form germania-doped silica fibers were unsuccessful since less than 1 wt.% of germania appeared in the fiber regardless of the amount of germanium tetrachloride supplied to the hydrolyzable mixture. It is theorized that the combustion flame temperature, combined with the overall furnace temperature of 1750°–1850° C. employed in those methods, is sufficiently high so that germania tends to volatilize rather than vitrify. Available vapor pressure data tends to support such a theory. However, glasses containing up to 100 wt.% high purity germania can be produced by the method disclosed in U.S. Patent application Ser. No. 321,109 entitled "Fused Oxide Type Glasses" filed Jan. 4, 1973 by P. C. Schultz. In accordance with that application, glasses having a high germania content can be produced by the flame hydrolysis process by depositing the oxide particles as a porous vitreous preform and then consolidating this porous preform to a solid nonporous body. The temperature must not exceed about 1600° C. in any case and should be maintained, during consolidation, within a range varying between the minimum consolidation temperature of the glass being produced and about 200° C. thereabove.

It was found that by maintaining process temperatures below those that would cause volatilization of GeO$_2$, step type optical waveguide fibers comprising germania doped cores could be formed. However, the numerical apertures of such fibers could not exceed about 0.2 since only a limited amount of GeO$_2$ could be incorporated into the fiber core due to a mismatch of core-cladding characteristics such as thermal coefficient of expansion and softening point temperature. Consider, for example, an attempt to fabricate by the flame hydrolysis process an optical waveguide fiber having a core comprising 20 wt.% GeO$_2$ and 80 wt.% SiO$_2$. The coefficient of expansion of such a core glass is about $19 \times 10^{-7}$ per degree C., while the coefficient of thermal expansion of a pure fused silica cladding is about $6 \times 10^{-7}$ per degree C., and the core-cladding expansion mismatch of about 13 points would probably cause the soot preform to crack during cooling after the soot consolidation process. The addition of about 13–18 wt.% $B_2O_3$ to the $SiO_2$ cladding glass will increase the expansion coefficient thereof to a value within acceptable limits so that preform breakage can be avoided. However, as a consequence of the addition of $B_2O_3$ to the cladding glass, the draw temperature of the cladding glass will be between 50° C. and 210° C. below that of the core glass, which is about 1800° C. With this kind of viscosity difference, fiber diameter control becomes a severe problem. Thus, optical waveguide fibers, wherein germania is employed as the refractive index increasing dopant material in the core, have had relatively limited Δ values.

The small Δ values of optical waveguides has resulted in numerical apertures that are much smaller than those of conventional optical fibers. Whereas the numerical apertures of commercial optical fibers or light pipes of the conventional type may be as high as about 0.6, the numerical apertures of optical waveguides have usually been between about 0.15 and 0.2.

Optical waveguides are often grouped into cables or bundles to provide redundancy in case of fiber breakage and to transmit a greater amount of the light generated by a source. Attenuation γ due to random fiber bends, which can be caused by the cabling process, is given by the equation:

$$\gamma = \frac{c}{\Delta}\left(\frac{a^2}{\Delta}\right)^p \quad (2)$$

where c and p are parameters related to the geometry of the random bends and fiber index gradient and a is the fiber core radius. Examination of equation 2 shows that the distortion loss γ can be reduced by decreasing the core radius, increasing Δ, or decreasing p and c by appropriate fiber packaging. The present invention has resulted from an attempt to decrease fiber loss due to random bends by increasing Δ. Because of the relationship set forth in equation 1 such fibers will also exhibit an increased NA.

SUMMARY OF THE INVENTION

It is an object of this invention to provide an economical and more easily formed optical waveguide fiber that overcomes the heretofore noted disadvantages.

Another object of this invention is to provide an optical waveguide fiber having a high numerical aperture.

A further object of this invention is to provide an optical waveguide in which both the thermal coefficient of expansion and the softening temperature of the core are compatible with those of the cladding regardless of the difference between the refractive indices of the core and cladding.

Briefly, according to this invention, an optical waveguide is produced comprising a cladding layer formed of relatively high purity glass and a core of high purity glass containing a sufficient amount of $GeO_2$ and $P_2O_5$ to increase the refractive index of the core to a value greater than that of the cladding layer. The cation impurity level of the core does not exceed 10 parts per million of transition elements.

The waveguide of this invention is an improvement over germania doped waveguides which have recently been employed in an attempt to provide waveguides of increased numerical aperture. The partial substitution of $P_2O_5$ for $GeO_2$ in the $GeO_2$-$SiO_2$ glass system results in a decrease in the softening point temperature with substantially no change in expansion coefficient. Depending upon the amount of $P_2O_5$ and $GeO_2$ in the resultant glass, there is often an increase in refractive index as compared with the corresponding $GeO_2$-$SiO_2$ glass which contains the same amount of $SiO_2$. These features are advantageous in that they permit high NA optical waveguide fibers to be fabricated with less difficulty than was heretofore encountered. By adjusting the ratio of $GeO_2$ to $P_2O_5$ in the core glass of an optical waveguide fiber the softening point temperature of the core glass can be made compatible with that of the cladding glass. Moreover, the waveguides of the present invention possess the advantages of germania doped fibers, viz., they are strong; they do not absorb an excessive amount of transmitted light; and they do not require a post-drawing heat treatment as in the case of titania containing fibers.

These and additional objects, features and advantages of the present invention will become apparent to those skilled in the art from the following detailed description and the attached drawings on which, by way of example, only the preferred embodiments of this invention are illustrated.

DETAILED DESCRIPTION OF THE INVENTION

Figures 1, 2:
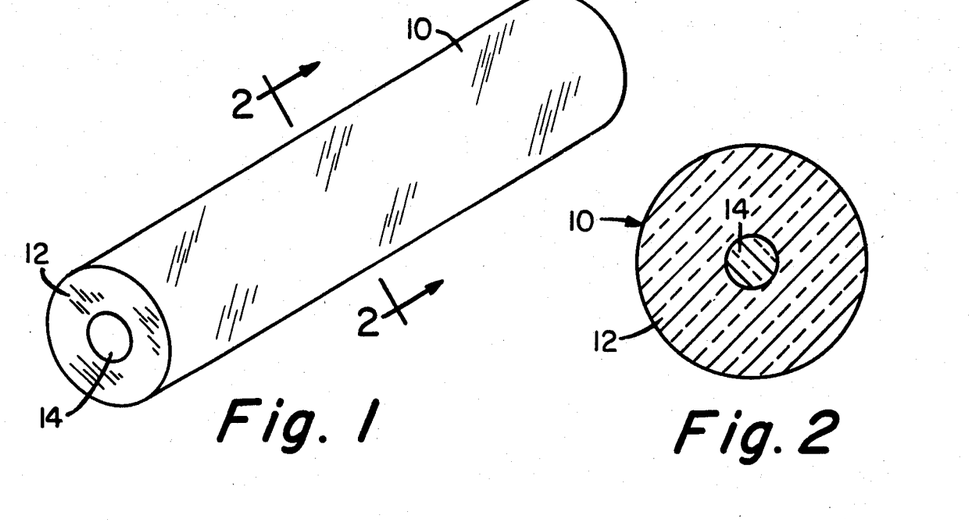
FIG. 1 is an oblique view of an optical waveguide in accordance with this invention.
FIG. 2 is a sectional view taken at lines 2—2 of FIG. 1.

It is to be noted that FIGS. 1 and 2 of the drawings are illustrative and symbolic of the invention, and there is no intention to indicate scale or relative proportions of the elements shown therein. Further, it is to be noted that the present invention expressly contemplates both single mode and multimode optical waveguides regardless of any specific description, drawing, or example set out herein. The present invention also contemplates optical waveguides having cores with either a constant or gradient index of refraction.

Referring to FIGS. 1 and 2, there is shown an optical waveguide 10 having a cladding layer 12 and a core 14. According to this invention the material of cladding layer 12 is relatively high purity glass and the material of core 14 is high purity glass containing an amount of $GeO_2$ and $P_2O_5$ sufficient to increase the refractive index of the core glass to a value higher than that of the cladding glass. In some optical waveguides the cladding does not exist as a distinct layer, the optical characteristics of which differ markedly from those of the core or adjacent layer. U.S. Pat. Nos. 3,647,406 and 3,785,718 issued to G. M. C. Fisher and D. C. Gloge, respectively, disclose optical waveguides wherein the refractive index gradually decreases from a relatively high value at the core to a lower value at the fiber surface. Whereas the cladding of an optical fiber conventionally comprises a layer of constant refractive index, it may be a layer in which the refractive index continuously changes in a decreasing manner, and indeed, the cladding may contain a region having a refractive index that is higher than the next adjacent layer of smaller radius but having a lower refractive index than the core. A few embodiments of this latter mentioned type of fiber are disclosed in said Gloge patent. Therefore, as used herein, the term cladding means that outer region of a fiber wherein an insignificant amount of power is propagated.

As will be hereinafter described in greater detail, the ratio of $P_2O_5$ to $GeO_2$ is selected to provide a core glass having a softening point temperature that is compatible with that of the cladding glass. Since the core glass portion of a redraw blank produced by the flame hydrolysis process contains a hole that must be closed, the core glass softening point temperature is preferably up to about 50° C. lower than that of the cladding glass so that the core glass will more readily flow and close the hole during the fiber forming process.

Figure 3:
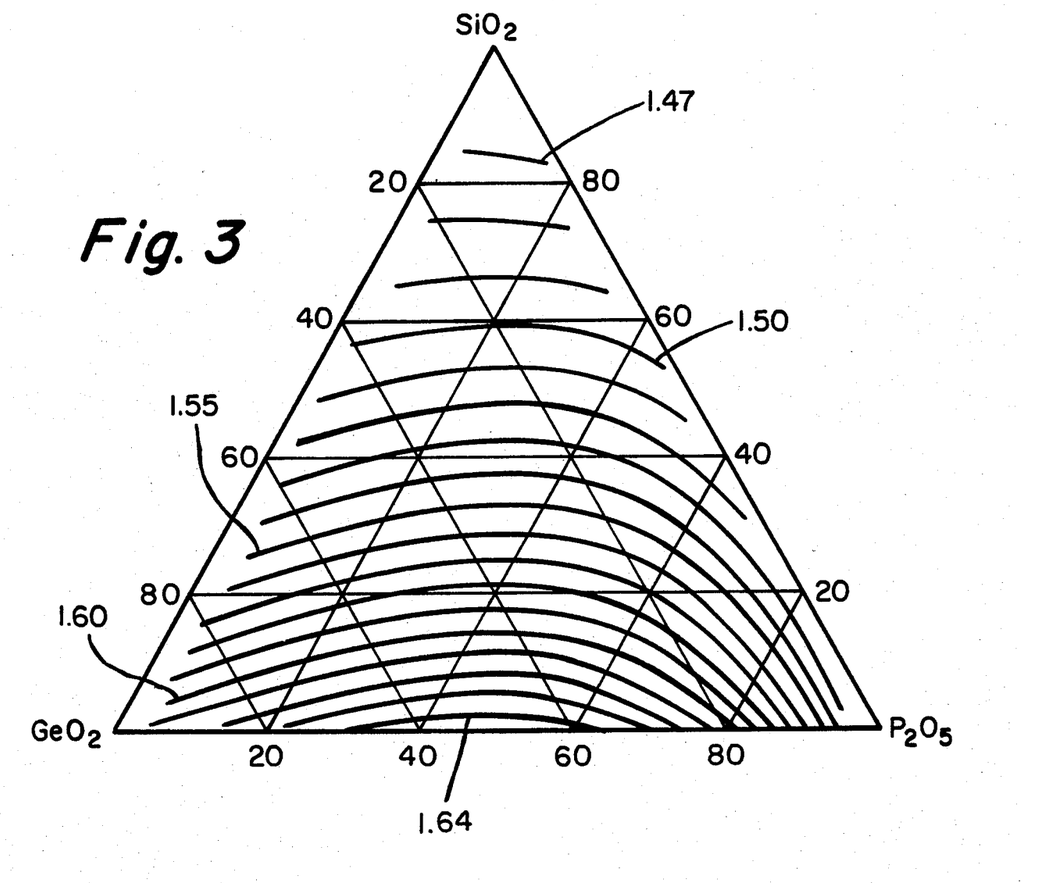
FIG. 3 is a ternary diagram in which refractive index is plotted as a function of wt.% composition in the $P_2O_5$-$GeO_2$-$SiO_2$ system.

A further advantage resulting from the substitution of $P_2O_5$ for a portion of the $GeO_2$ in binary $GeO_2$-$SiO_2$ glasses is evident from FIG. 3 wherein refractive index is plotted as a function of wt.% composition in the $P_2O_5$-$GeO_2$-$SiO_2$ system. It was unexpectedly found that the substitution of $P_2O_5$ for some of the $GeO_2$ in a germania silicate glass can result in a ternary glass having an increased refractive index even though the refractive index of $P_2O_5$ is lower than that of $GeO_2$. Moreover, such substitution results in very little change in expansion coefficient. From FIG. 3 it can be seen that those glasses comprising less than 70 wt.% $SiO_2$ exhibit a discernible change in refractive index when $P_2O_5$ is substituted for some of the $GeO_2$. It is further noted that for any given $SiO_2$ level in the range between 0 and 70 wt.% $SiO_2$ the refractive index is highest when the amount of $P_2O_5$ present is about 40–60 wt.% of the total amount of dopant ($P_2O_5 + GeO_2$).

It may be desirable to substitute $P_2O_5$ for some of the $GeO_2$ in a germania silicate core glass even if the refractive index of the resultant glass is the same as that of the germania silicate glass since $P_2O_5$ is less expensive than $GeO_2$. For example, the refractive index of a glass comprising 56.4 wt.% $SiO_2$ and 43.6 wt.% $GeO_2$ is about 1.5. Even though the refractive index of a glass comprising 56.4 wt.% $SiO_2$, 7.4 wt.% $GeO_2$ and 36.2 wt.% $P_2O_5$ is also about 1.5, this latter mentioned glass would be much less expensive than the former due to the substitution of $P_2O_5$ for most of the $GeO_2$.

Table I compares various properties of glasses in the $GeO_2$-$SiO_2$-$P_2O_5$ system with those of the $GeO_2$-$SiO_2$ system, the wt.% $SiO_2$ being the same in both glass systems, and thus reveals some of the effects resulting from a partial substitution of $P_2O_5$ for $GeO_2$ in germania silicate glasses.

TABLE I

Properties of $P_2O_5$—$GeO_2$—$SiO_2$ Glasses

| Glass | Composition (wt. %) | | | Refractive Index n | Refractive Index n' | Δn | Softening Temperature (°C.) | Annealing Temperature (°C.) |
|---|---|---|---|---|---|---|---|---|
| | GeO₂ | SiO₂ | P₂O₅ | | | | | |
| AA | 89.2 | 0 | 10.8 | 1.620 | 1.608 | 0.012 | 660 | — |
| AB | 82.7 | 0 | 17.3 | 1.628 | 1.608 | 0.020 | 690 | — |
| AC | 78.6 | 0 | 21.4 | 1.632 | 1.608 | 0.024 | 715 | — |
| AD | 93.2 | 6.8 | 0 | 1.594 | — | — | 925 | 556 |
| AE | 82.3 | 17.7 | 0 | 1.563 | — | — | 930 | 571 |
| AF | 79.4 | 20.6 | 0 | 1.558 | — | — | 1040 | 632 |
| AG | 58.7 | 25.7 | 15.6 | 1.554 | 1.546 | 0.008 | 817 | 618 |
| AH | 60.1 | 26.2 | 13.1 | 1.552 | 1.544 | 0.008 | 822 | 613 |
| AI | 61.8 | 29.6 | 8.6 | 1.546 | 1.537 | 0.009 | 875 | 603 |
| AJ | 29.4 | 33.7 | 36.9 | 1.546 | 1.531 | 0.015 | 890 | 759 |
| AK | 35.5 | 34.1 | 30.4 | 1.542 | 1.531 | 0.011 | 863 | 721 |
| AL | 48.0 | 34.6 | 17.4 | 1.538 | 1.530 | 0.008 | 830 | 652 |
| AM | 41.0 | 36.0 | 23.0 | 1.541 | 1.529 | 0.012 | 843 | 678 |
| AN | 17.3 | 40.7 | 42.0 | 1.533 | 1.521 | 0.012 | 900 | 776 |
| AO | 23.6 | 43.2 | 33.2 | 1.533 | 1.518 | 0.015 | — | 762 |
| AP | 30.4 | 45.4 | 24.2 | 1.528 | 1.515 | 0.013 | 878 | 725 |
| AQ | 36.6 | 45.5 | 17.9 | 1.524 | 1.515 | 0.009 | 895 | 685 |
| AR | 43.1 | 46.3 | 10.5 | 1.520 | 1.513 | 0.007 | 996 | 639 |
| AS | 13.7 | 46.6 | 39.7 | 1.520 | 1.513 | 0.007 | 900 | 709 |
| AT | 12.6 | 51.7 | 35.7 | 1.510 | 1.505 | 0.005 | 897 | 704 |
| AU | 7.6 | 52.8 | 39.6 | 1.506 | 1.505 | 0.001 | 890 | 649 |
| AV | 18.6 | 53.2 | 28.2 | 1.508 | 1.504 | 0.004 | 914 | 731 |
| AW | 25.9 | 54.6 | 19.5 | 1.508 | 1.502 | 0.006 | 951 | 704 |
| AX | 7.4 | 56.4 | 36.2 | 1.500 | 1.500 | 0.000 | 897 | — |
| AY | 0 | 62.9 | 37.1 | 1.488 | 1.491 | −0.003 | 932 | 691 |
| AZ | 0 | 64.0 | 36.0 | 1.488 | 1.490 | −0.002 | 932 | — |
| BA | 23.0 | 65.4 | 11.6 | 1.490 | 1.489 | 0.001 | 1131 | 710 |
| BB | 0 | 66.4 | 33.6 | 1.484 | 1.487 | −0.003 | 968 | 611 |
| BC | 22.9 | 66.7 | 9.4 | 1.488 | 1.485 | 0.005 | 1158 | 731 |
| BD | 15.0 | 66.7 | 18.3 | 1.490 | 1.487 | 0.003 | 1055 | 708 |
| BE | 7.7 | 67.7 | 24.6 | 1.490 | 1.485 | 0.005 | 996 | 690 |
| BF | 13.2 | 81.6 | 5.2 | 1.471 | 1.471 | 0.000 | — | — |
| BG | 7.2 | 82.9 | 9.9 | 1.470 | 1.470 | 0.000 | 1270 | 853 |
| BH | 11.3 | 84.8 | 3.9 | 1.475 | 1.470 | 0.005 | 1402 | — |
| BI | 5.1 | 91.4 | 3.5 | 1.464 | 1.464 | 0.000 | 1268 | 937 |
| BJ | 0 | 90.6 | 9.4 | 1.464 | — | — | 1330 | 888 |
| BK | 0 | 94.0 | 6.0 | 1.460 | — | — | 1403 | 938 |
| BL | 0 | 100.0 | 0 | 1.458 | — | — | 1585 | 1050 |
| BM | 0 | 0 | 100.0 | 1.507 | — | — | — | — |

TABLE I-continued

| | Composition (wt. %) | | | Properties of P₂O₅—GeO₂—SiO₂ Glasses | | | | |
| --- | --- | --- | --- | --- | --- | --- | --- | --- |
| | | | | Refractive Index | Refractive Index | | Softening | Annealing |
| Glass | GeO$_2$ | SiO$_2$ | P$_2$O$_5$ | n | n' | Δn | Temperature (°C.) | Temperature (°C.) |
| BN | 100.0 | 0 | 0 | 1.608 | — | — | 867 | 526 |

The compositions set forth in Table I were made by the following two processes. Glasses AA through BE, BM and BN were made using conventional melting techniques. Weighed amounts of the batch were mixed and melted in 500 cc platinum crucibles for 6–10 hours in an electric furnace at 1650° C. After melting, the glasses were annealed at the annealing temperature for 3 to 4 hours in the crucible and cooled at furnace rate to room temperature. Glass samples were then core drilled from the crucible, and specimens for viscosity and expansion measurements were prepared therefrom.

Glasses BF through BL, which contain over 80 wt. percent SiO$_2$, were prepared by the flame hydrolysis technique, phosphorus trichloride, germanium tetrachloride and silicon tetrachloride being employed as sources for P$_2$O$_5$, GeO$_2$ and SiO$_2$, respectively. After the soot blanks were consolidated, specimens for various property studies were cut, ground and polished.

In order to evaluate the effect on refractive index due to the substitution of P$_2$O$_5$ for GeO$_2$ in GeO$_2$—SiO$_2$ glasses, the refractive indices n' of the corresponding glasses of the GeO$_2$—SiO$_2$ system containing the same amount of SiO$_2$ are also listed in Table I. The change in refractive index due to substitution of P$_2$O$_5$ is tabulated as Δn. Refractive index measurements were obtained at the sodium D-line.

It can be seen that Δn is positive for all germania-containing glasses. The refractive index of P$_2$O$_5$ glass being lower than that of GeO$_2$ glass, a positive value of Δn suggests that the increase is not due simply to ideal mixing of the two substances. It is believed that this increase in index arises because of a change in coordination number of some of the Ge atoms from 4 to 6. Phosphorus pentoxide exists in the form of P$_4$O$_{10}$ molecules which are linked together by weak van der Walls forces. The P$_4$O$_{10}$ molecule is made up of four identical tetrahedra with the phosphorus atoms at the center. These tetrahedra are interconnected such that there is one non-bridging oxygen in each tetrahedra. It is hypothesized that these non-bridging oxygen atoms produce the change in coordination number of germanium atoms and hence increase the refractive index of the glass.

The refractive indices of pure SiO$_2$ glass, GeO$_2$ glass and P$_2$O$_5$ glass are 1.458; 1.608 and 1.507, respectively, as given in Table I. The refractive indices of those binary glasses of Table I which do not contain SiO$_2$, such as glasses AA through AC, are significantly higher than either a P$_2$O$_5$ glass or a GeO$_2$ glass, a fact in support of the abovementioned theory. It is noted that the value of Δn in these glasses increases with an increase in P$_2$O$_5$ content.

In general, Δn decreases with increasing SiO$_2$ content as evidenced by glasses BE through BI. This may be due to the smaller number of germanium atoms available for a change in coordination number. However, although the change in Δn is less for these high SiO$_2$ content glasses, it is not negative in GeO$_2$ containing glasses. Since the refractive indices of P$_2$O$_5$—SiO$_2$ glasses, viz. glasses AY, AZ and BB, are lower than corresponding GeO$_2$—SiO$_2$ glasses it is evident that the addition of P$_2$O$_5$ to GeO$_2$—SiO$_2$ glasses increases the refractive indices thereof even at low GeO$_2$ concentrations.

Thermal expansion measurements, which were made on a differential dilatometer, were generally made at a heating rate of 600° C./hour. The linear expansion coefficient was calculated for the 25°–300 ° C. range. The expansion coefficient of each ternary glass listed in Table I was measured and compared with the corresponding glass of the GeO$_2$—SiO$_2$ system containing the same amount of SiO$_2$. The change in expansion coefficient for each such comparison was found to be less than $\pm 5 \times 10^{-7}$ which was smaller than the experimental error in these measurements. Thus, the substitution of P$_2$O$_5$ for GeO$_2$ in the GeO$_2$—SiO$_2$ glass system does not result in any appreciable change in expansion coefficient.

The softening point temperature, that temperature at which the viscosity of a glass is $10^{7.6}$ poise, is also listed in Table I. It is seen that the partial substitution of P$_2$O$_5$ for GeO$_2$ results in a softening point temperature that is lower than that of the corresponding GeO$_2$—SiO$_2$ glass. Also listed in Table I is the annealing temperature, that temperature at which the viscosity of the glass is $10^{13}$ poise. The annealing temperature increases with increasing P$_2$O$_5$ content in the glass, an effect contrary to that caused by the addition of P$_2$O$_5$ on softening temperature. It is possible that due to a change in coordination number of some of the Ge atoms from 4 to 6, the glass has a rigid structure at the lower temperatures in the annealing range. At the higher temperatures in the softening temperature range, these bonds are broken, thereby resulting in a lower viscosity. The softening point temperature is of interest since fibers are drawn at a viscosity near the softening point temperature viscosity. A fiber is more easily drawn if the softening point temperatures of the core and cladding glasses are closely matched, the core glass preferably having a viscosity that is about 1–4 times lower than the cladding glass at the drawing temperature.

Because of the heretofore noted properties of glasses in the GeO$_2$—SiO$_2$—P$_2$O$_5$ system, optical waveguides embodying such glasses are more easily formed and have higher numerical apertures than prior art waveguides. In general, the cladding may consist of a high purity optical glass such as silica or a silica containing glass. The core glass comprises a high purity optical glass containing an amount of GeO$_2$ and P$_2$O$_5$ that is sufficient to provide a refractive index necessary to obtain the desired NA. The relative amounts of GeO$_2$ and P$_2$O$_5$ are selected to render the softening temperature of the core compatible with that of the cladding. It has been found that in order to avoid excessive light attenuation, the core glass of the waveguide of the present invention must have a cation impurity level not exceeding ten parts per million of transition elements. The preferred cladding material is a silicate glass containing an amount of B$_2$O$_3$ that is sufficient to render the expansion coefficient of the cladding compatible with that of the core. The expansion coefficient of the core may equal that of the cladding, but it preferably exceeds that of the cladding by up to about $5 \times 10^{-7}$ per degree C. to provide a compressive force in the cladding which strengthens the resultant waveguide fiber; however it may tolerably exceed that of the cladding by about $15 \times 10^{-7}$ per degree C.

To design an optical waveguide fiber in accordance with the present invention the required fiber NA is first determined. Knowing the type of cladding material to be employed, the cladding refractive index $n_2$ is known. For example, if the cladding material is $SiO_2$ doped with $B_2O_3$, $n_2$ is taken to be 1.458, the refractive index of silica. Using the well known relationship $$NA = \sqrt{n_1^2 - n_2^2} \qquad (3)$$

the core refractive index $n_1$ is determined. The total dopant level of $GeO_2$ and $P_2O_5$ can be determined from Fig. 3. If, for example, $n_1$ is determined to be 1.48, the core glass will contain about 74 wt.% $SiO_2$ and 26 wt.% ($GeO_2$ and $P_2O_5$).

Figure 4:
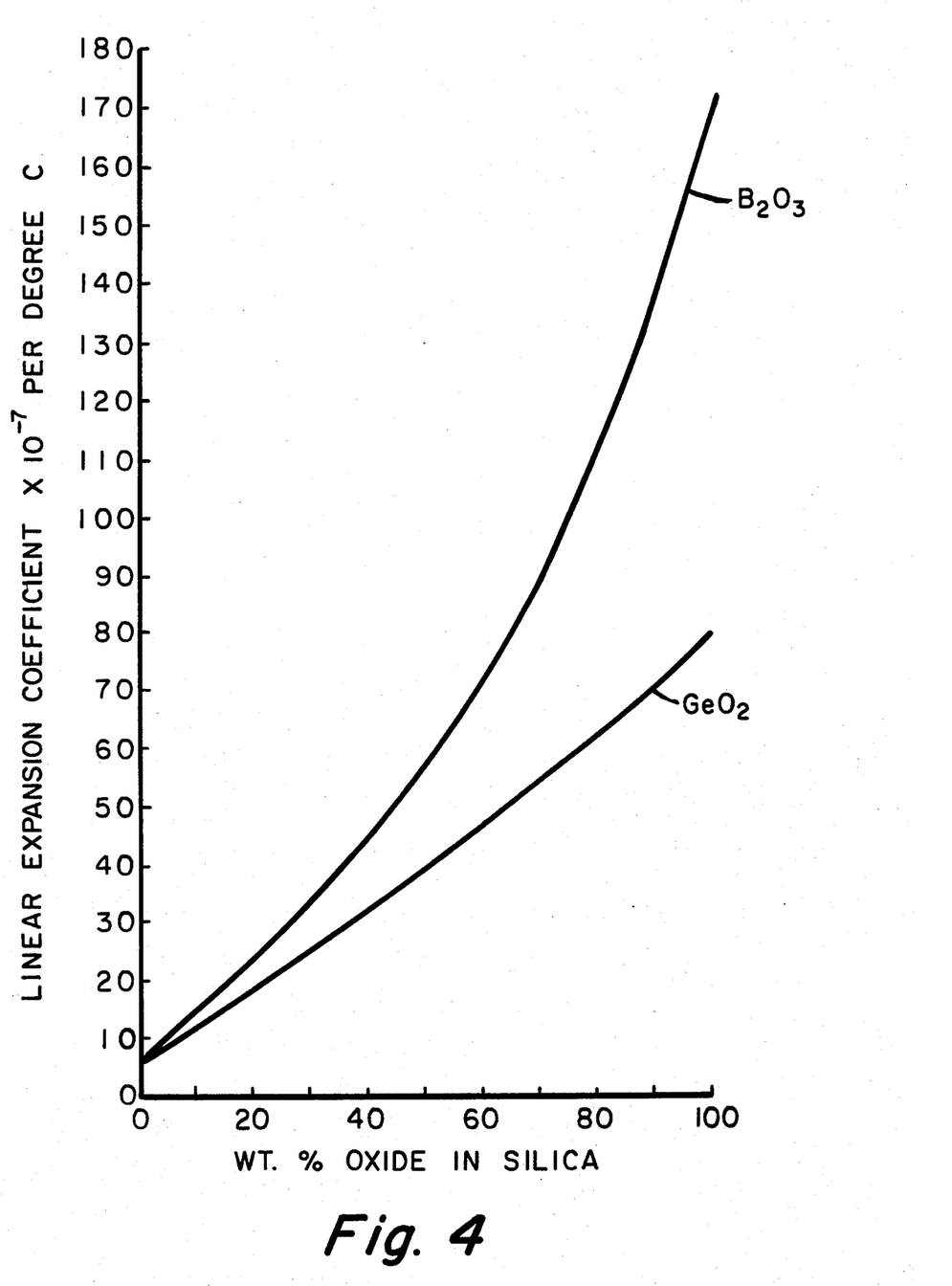
FIG. 4 is a graph wherein linear expansion coefficient (25°–200° C.) is plotted as a function of weight percent oxide in silica for both the $B_2O_3$-$SiO_2$ and $GeO_2$-$SiO_2$ systems.

Since the expansion of a $GeO_2$—$SiO_2$ glass is substantially the same as a $GeO_2$—$SiO_2$—$P_2O_5$ glass having the same silica content, FIG. 4 can be used to determine the amount of $B_2O_3$ that must be present in the cladding glass to match the expansion coefficient of the cladding to that of the core. For example, a core glass containing about 30 wt.% dopant material ($GeO_2$ plus $P_2O_5$) has an expansion coefficient of about $25 \times 10^{-7}$ per degree C., which corresponds to a cladding glass of 21 wt.% $B_2O_3$ and 79 wt.% $SiO_2$. Since the expansion coefficient of the core may be up to 5 points higher than that of the cladding, the cladding glass may contain between about 16–21 wt.% $B_2O_3$, thereby providing an expansion coefficient between 20 and $25 \times 10^{-7}$ per degree C.

Figure 5:
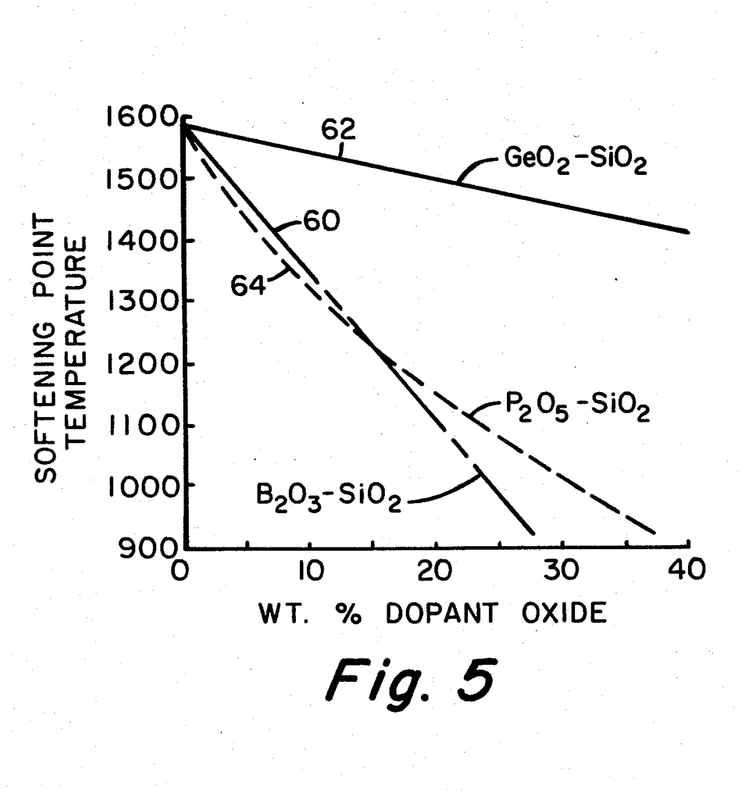
FIG. 5 is a graph wherein softening point temperature at η equals $10^{7.6}$ is plotted as a function of weight percent $GeO_2$, $P_2O_5$ or $B_2O_3$ for glasses in the $GeO_2$-$SiO_2$, $P_2O_5$-$SiO_2$ and $B_2O_3$-$SiO_2$ systems.

The softening point temperature of the cladding glass is determined from curve 60 of FIG. 5. Due to the high softening point temperatures of germania silicate glasses, as illustrated by curve 62, a germania silicate core glass will be harder than the cladding glass at fiber drawing temperatures. However, curve 64 illustrates the fact that the softening point temperatures of $P_2O_5$—$SiO_2$ glasses are much lower than those of the germania silicate system. It has been found that there is no interaction between $P_2O_5$ and $GeO_2$ when these two oxides are present together, insofar as softening point temperature is concerned. Moreover, since curve 62 is linear, the following relationship can be used for calculating the softening temperature $T_{tg}$ of the ternary glass $xP_2O_5$—$yGeO_2$—$zSiO_2$:

$$T_{tg} = T_1 - yS \qquad (4)$$

where $T_1$ is the softening point temperature of the binary glass $xP_2O_5 \cdot (y+z) SiO_2$ as determined from curve 64 of FIG. 5, and S is the decrease in softening temperature of the binary $GeO_2$—$SiO_2$ glass per percent addition of $GeO_2$, which has been determined from curve 62 to be 4.52. The total amount of dopant $(x+y)$, as mentioned hereinabove, is that amount necessary to provide a refractive index $n_1$. By a trial and error procedure different values of x can be assumed until the desired softening temperature is obtained. It is noted that a ternary graph of softening point temperature would provide a direct reading of temperature $T_{tg}$, thereby eliminating this trial and error process.

Referring to FIG. 3, refractive index is relatively constant with respect to $SiO_2$ content for concentrations of $SiO_2$ over 70 wt.%. However, refractive index is nonlinear with $P_2O_5$ or $GeO_2$ concentrations in that region of FIG. 3 wherein $SiO_2$ content is less than 70%. To select a core composition in this latter mentioned region a trial and error method may have to be employed in order to optimize refractive index, expansion and softening point temperature of the core and cladding glasses.

Due to the high purity glass which must be employed for the core, the redraw blank is prepared by a flame hydrolysis process similar to that disclosed in the aforementioned U.S. Pat. Nos. 3,711,262; 3,737,292; 3,737,293 and 3,826,560. In a manner which is now conventional for making low loss glass optical waveguide fibers, a layer of glass soot is deposited on a cylindrical glass starting member by means of a flame hydrolysis burner to which fuel gas and oxygen or air are supplied to produce the flame. Liquid constituents required to form the glass soot are stored in containers having controlled temperatures. A suitable gaseous medium such as oxygen, nitrogen or the like is bubbled through the liquids where predetermined amounts of vapor form the liquids are entrained therewith and carried to the flame. The amount of each constituent supplied to the flame is determined by the temperature of liquid and the rate of flow of the carrier gas through the liquid. Some constituents, which are in gaseous form, are supplied directly to the flame. In the flame the constituents are oxidized to form glass soot that is directed toward the starting member. For a step-index waveguide the first applied soot layer, which is to form the core, has a homogeneous composition. To form a gradient index waveguide the flow rate of at least one of the constituents is varied as taught in U.S. Pat. No. 3,826,560. After the first soot layer reaches a predetermined thickness the composition is changed, and a second soot layer, which will form the waveguide cladding material, is deposited. The first soot layer can be consolidated prior to depositing the second soot layer, or both soot layers can be simultaneously consolidated. In view of the volatility of $GeO_2$ and $P_2O_5$ the precautions set forth in the aforementioned Schultz application pertaining to soot deposition and consolidation should be taken. Any glass layer containing $GeO_2$ and $P_2O_5$ should be produced by depositing the oxide particles as a porous vitreous body and then consolidating this porous soot preform to a solid nonporous body. The temperature of both the flame and the atmosphere surrounding the preform should be low enough that the glass remains in soot form rather than consolidating during deposition from the flame. Moreover, the consolidation temperature must not exceed about 1600° C. and should be maintained within a range varying between the minimum consolidation temperature of a particular glass and about 200° C. thereabove.

The soot blank is then cooled and the starting rod or member is removed by sliding it from the soot blank. The resultant soot blank is then consolidated. It is then heated and drawn into an optical fiber.

Optical fibers of the type to which the present invention pertains are generally useful at wavelengths between about 450 and 1350 nm. To be commercially acceptable, such fibers must exhibit an attenuation less than 100 dB/km between 800 and 900 nm. Since fibers having an attenuation less than 10 dB/km between 800 and 900 nm have been produced in accordance with the present invention, they are useful as the light propagating medium in optical communication systems.

A specific example of designing an optical waveguide of the present invention is as follows. Based upon such considerations as the type of light source to be employed and the types of bends to which a fiber will be subjected, a specific numerical aperture is selected. This example will assume that the fiber must have a numerical aperture of 0.24. It will also be assumed that the cladding material is a borosilicate glass which has a refractive index of about 1.458.

From equation 3, the refractive index $n_1$ of the core is determined to be 1.477.

Figure 6:
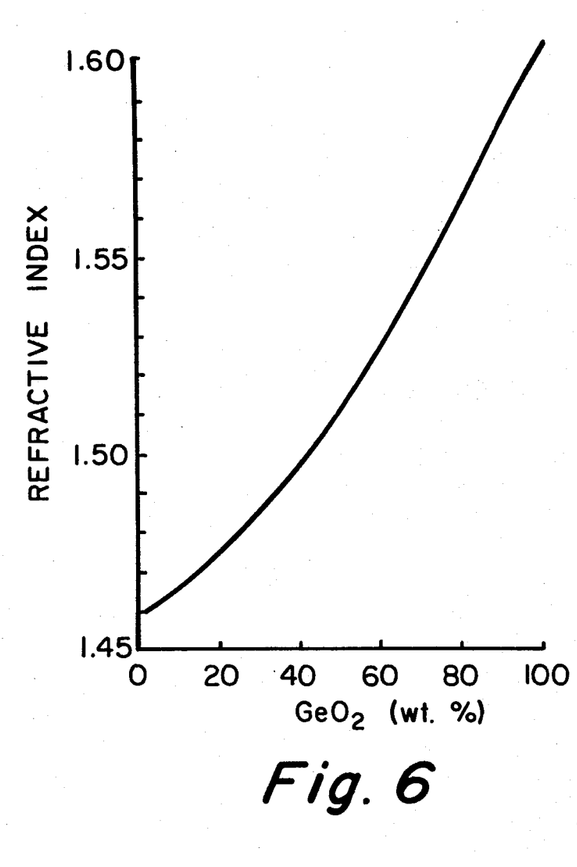
FIG. 6 is a graph wherein refractive index is plotted as a function of weight percent $GeO_2$ for glasses in the $GeO_2$-$SiO_2$ system.

To illustrate the primary advantage of the waveguide of the present invention, the difficulties encountered in forming a prior art waveguide having a germania silicate core will initially be considered. From FIG. 6 it is determined that the core glass should consist of 23 wt.% $GeO_2$ to provide a binary $GeO_2$—$SiO_2$ glass having a refractive index of 1.477. Referring to FIG. 4, the expansion coefficient of such a glass is about $20 \times 10^{-7}$ per degree C. A pure $SiO_2$ cladding should not be employed with a core containing 23 wt.% $GeO_2$ since the expansion mismatch between the core and cladding would render it difficult to consolidate the soot preform without it breaking. Thus, a borosilicate cladding having a roughly matching thermal expansion coefficient is selected. From FIG. 4 it is determined that a cladding glass of 12 wt.% $B_2O_3$ 88 wt.% $SiO_2$ has an expansion coefficient of about $17 \times 10^{-7}$ per degree C. The core having an expansion coefficient $3 \times 10^{-7}$ per degree C. greater than the cladding, the cladding will be put into a state of compression, thereby strengthening the resultant fiber. For this combination of core and cladding glasses the softening point temperature for the core and cladding is 1485° C. and 1310° C., respectively, values which are obtained from FIG. 5. This mismatch of 175° C. in the softening temperatures of the core and cladding glasses creates problems in the fiber drawing process. Since the core glass has a higher softening point temperature than the cladding glass, the hole in the redraw blank cannot be closed. To prevent this problem the core should have a softening point temperature that is lower than that of the cladding to such an extent that the core viscosity is about 1-4 times lower than the cladding at drawing temperature.

A prior art technique for lowering the softening point temperature of the core involved adding $B_2O_3$ to the core glass. Addition of $B_2O_3$ does not, however, increase the refractive index of the core glass but increases the thermal expansion coefficient. To match this increased thermal expansion coefficient of the core glass, more $B_2O_3$ must be added to the cladding glass, thereby bringing back the viscosity mismatch problem. To overcome this problem of viscosity mismatch a core glass additive is needed which can increase the refractive index and decrease the viscosity without resulting in an increase in the thermal expansion coefficient.

In accordance with the present invention $P_2O_5$ is substituted for a portion of the $GeO_2$ in the core to lower the softening point temperature of the core without lowering the core refractive index. At the 0–30 wt.% dopant level the change in refractive index of $SiO_2$ due to $GeO_2$ and $P_2O_5$ is substantially linear and is about the same for both of these dopants. Thus, if $P_2O_5$ is substituted for some of the $GeO_2$ in the present example, the refractive index of the resultant glass is substantially unaffected, provided that the $SiO_2$ content remains unchanged. There is therefore a 23 wt.% $(GeO_2+P_2O_5)$.77 wt.% $SiO_2$ glass which has substantially the same refractive index and substantially the same expansion coefficient as 23 wt.% $GeO_2$.77 wt.% $SiO_2$ glass. If FIG. 5 is used in conjunction with equation 4 to select a ternary core glass having an acceptable softening point temperature, a trial and error approach may have to be used. For example, a core glass having the composition 5 wt.% $P_2O_5$.18 wt.% $GeO_2$.77 wt.% $SiO_2$ may be initially assumed. Referring to curve 64 of FIG. 5, the softening point temperature of the binary glass 5 wt.% $P_2O_5$.95 wt.% $SiO_2$ is 1430° C. Since the assumed core glass contains 18 wt.% $GeO_2$ the term yS of equation 4 is equal to $(18 \times 4.52)$ or 81.36° C. The softening point temperature of the assumed ternary glass, as determined by equation 4, is therefore 1348.64° C. Since the assumed core glass has a softening point temperature that is about 38° C. greater than that of the cladding, it is unsatisfactory.

Since a core glass is needed having a greater amount of $P_2O_5$ than was present in the initially assumed composition, a core composition 10 wt.% $P_2O_5$.13 wt.% $GeO_2$.77 wt.% $SiO_2$ might be satisfactory. Again employing equation 4 in conjunction with curve 64 of FIG. 5, the softening point temperature is determined to be 1262° C. For this core composition the softening point temperature of the core is about 48° C. lower than that of the cladding, a relationship which is desirable in that it would enable the hole in the redraw blank to be more easily closed during fiber drawing.

Since the core and cladding glasses of optical waveguide fibers must be extremely pure, the core glass having a cation impurity level not exceeding ten parts per million, the fibers of the present invention should be produced by the flame hydrolysis process. After the core and cladding compositions are determined by some suitable method such as that described hereinabove, the various parameters of the flame hydrolysis apparatus such as temperatures and flow rates of the constituents supplied to the flame are determined in a manner well known to those skilled in the art. Due to the volatility of $GeO_2$ and $P_2O_5$, an amount of these oxides less than the theoretically calculated amount is actually deposited. Thus the flow rates of the carrier gases through the liquid constituents which form these oxides must be empirically determined. The following examples illustrate the manner in which waveguides of different types and compositions are formed.

EXAMPLE 1

A specific example of forming an optical waveguide of the present invention is as follows. A blank containing core and cladding layers is prepared by a method similar to that disclosed in the aforementioned U.S. Pat. No. 3,737,292. Germanium tetrachloride, $GeCl_4$, vapors at a temperature of 32° C. and silicon tetrachloride, $SiCl_4$, vapors at a temperature of 32° C. are fed to a flame hydrolysis burner by means of a dry oxygen carrier gas at flow rates of 0.4 liter per minute and 2.0 liters per minute, respectively. Phosphorus trichloride, $PCl_3$, vapors at a temperature of 35° C. are carried to the flame hydrolysis burner by nitrogen flowing at a rate of 0.5 liter per minute. Natural gas and oxygen are fed to the burner at flow rates of 8 and 8.5 liters per minute, respectively. Glass soot from the flame hydrolysis burner is then deposited on a borosilicate glass starting rod having a ¼ inch diameter. The starting rod is rotated at about 60 RPM and is translated with respect to the burner at a rate of about 1 inch per second. The soot is deposited on the starting rod until a diameter of about 1.5 inch is reached, the soot thus deposited constituting the fiber core. Gas flow through the GeCl$_4$ and PCl$_3$ is stopped, and a flow of BCl$_3$ is introduced into the burner at a rate of 0.28 liter per minute along with the continued flow of SiCl$_4$ vapor. The resultant B$_2$O$_3$-SiO$_2$ soot, which will constitute the fiber cladding, is deposited until the diameter of the soot blank is about 2.5 inches. The soot blank is then cooled and the starting rod is removed from the soot blank by sliding the starting rod out of the soot blank. The soot blank is then consolidated or sintered at a temperature of about 1350° C. in a helium atmosphere. After the soot is consolidated, the blank has a diameter of about 1 inch and a length of about 4.5 inches. The blank is then heated to a temperature of about 1600° C. and drawn in an oxygen atmosphere to the final optical waveguide dimensions.

An optical waveguide produced in accordance with the above example was drawn to an outside diameter of 125 μm, the cladding thickness being about 50 μm. The waveguide thus produced had a numerical aperture of 0.155 and an optical loss of 9.6 dB/km at a wavelength of 820 nm. The glass composition of the core was estimated to be 5 wt.% P$_2$O$_5$, 6 wt.% GeO$_2$ and 89 wt.% SiO$_2$, and that of the cladding was estimated to be 5 wt.% B$_2$O$_3$ and 95 wt.% SiO$_2$.

Following are three theoretical examples. Examples 2 and 3 concern methods of making fibers which would have higher values of numerical aperture than that which was achieved by the method of Example 1. Example 4 pertains to a method which could be employed to make a gradient index fiber by the flame hydrolysis process.

EXAMPLE 2

A soot blank containing core and cladding layers is formed in accordance with a method similar to that described in Example 1, except that the core contains no silica. Oxygen is bubbled through POCl$_3$ and GeCl$_4$ which are maintained at 35° C. and 32° C., respectively, to produce vapors which flow at 5.5 liter per minute and 1.0 liter per minute, respectively, to the burner. After a soot diameter of 1.5 inch has built up on the 1.4 inch starting rod the core material gas flow stops and a flow of gases is initiated for forming the cladding material. Oxygen is bubbled through SiCl$_4$ that is maintained at 32° C. and the resultant vapor is transported to the flame hydrolysis burner along with BCl$_3$ from a source which is maintained at 30° C. The flow rates of the oxygen through the SiCl$_4$ and BCl$_3$ vapors are 2.0 liters per minute and 0.73 liters per minute, respectively. After the diameter of the soot blank reaches 2.5 inches, it is cooled, and the starting member is removed. The soot blank is sintered at a temperature of about 550° C. in a helium atmosphere, and the resultant redraw blank is thereafter heated to about 650° C. and drawn in an oxygen atmosphere to form a fiber. The composition of the core is 50 wt.% P$_2$O$_5$ and 50 wt.% GeO$_2$, the cladding being 50 wt.% SiO$_2$ and 50 wt.% B$_2$O$_3$. The NA of the resultant fiber is 0.77 which is greater than the value which can be obtained by forming a fiber core of either 100% GeO$_2$ or 100% P$_2$O$_5$.

EXAMPLE 3

In a process similar to that described in Example 1 first and second layers of soot are deposited on a ¼ inch diameter starting rod. The soot forming constituents are POCl$_3$, GeCl$_4$, SiCl$_4$ and BCl$_3$ which are maintained at 35° C., 32° C., 32° C. and 25° C., respectively. To form the first soot layer, oxygen is bubbled through the POCl$_3$, GeCl$_4$ and SiCl$_4$ at rates of 3.1 liters per minute, 0.3 liter per minute and 1.0 liter per minute, respectively, and the resultant vapors are fed to the flame hydrolysis flame. When the diameter of the first soot coating reaches 1.5 inch, the gas flow through the POCl$_3$ and GeCl$_4$ is stopped, the rate of oxygen flow through the SiCl$_4$ is increased to 2 liters per minute, and BCl$_3$ is fed to the flame at a rate of 0.3 liter per minute. Soot deposition is continued until a diameter of about 2.5 inches is achieved. The soot blank is cooled, and the starting rod is removed. The soot blank is sintered at about 1000° C. in a helium atmosphere to form a redraw blank that is drawn at a temperature of about 1150° C. in an oxygen atmosphere to form a fiber having a numerical aperture of about 0.307. The composition of the core is 12 wt.% GeO$_2$, 22 wt.% P$_2$O$_5$ and 66 wt.% SiO$_2$, and that of the cladding is 20 wt.% B$_2$O$_3$ and 80 wt.% SiO$_2$.

One of the advantages of the present invention arises from the fact that most glass compositions in the ternary P$_2$O$_5$-GeO$_2$-SiO$_2$ system have refractive indices that are greater than those of the corresponding glasses of the binary GeO$_2$-SiO$_2$ system wherein the SiO$_2$ content is the same. This advantage can be illustrated by comparing the fiber of the last described example with similar fibers having germania silicate glass cores. The total dopant level (P$_2$O$_5$+GeO$_2$) of the core of the fiber of Example 3 is 34 weight percent of the total glass composition. A fiber having a core consisting of 34 weight percent GeO$_2$ and 66 weight percent SiO$_2$ would have a numerical aperture of only 0.297, which is 0.01 less than that of the fiber of Example 3. If germania were the only dopant added to the silica to form a fiber core, 36 weight percent GeO$_2$ would be needed to provide a numercial aperture of 0.307, assuming that the cladding composition remained unchanged.

EXAMPLE 4

The following specific example of a waveguide of the present invention is one having a gradient index of refraction. Liquid GeCl$_4$ is maintained at a temperature of 32° C. in a first container, liquid SiCl$_4$ is maintained at 32° C. in a second container, and liquid POCl$_3$ is maintained at 35° C. in a third container. Dry oxygen is bubbled through these liquid constituents so that vapors of each are picked up thereby and delivered to the burner. The oxygen is initially bubbled through the POCL$_3$, GeCl$_4$ and SiCl$_4$ at 3.1 liters per minute, 0.3 liters per minute and 2 liters per minute, respectively. Under these conditions the vapors entrained with the oxygen are hydrolyzed and oxidized within the flame of the flame hydrolysis burner to provide a soot of 22 wt. percent P$_2$O$_5$, 12 wt. percent GeO$_2$ and 66 wt. percent SiO$_2$. The soot is deposited as a layer on a rotating and translating borosilicate glass tube having an outside diameter of 6 mm. As the soot layer builds up, the flow of dry oxygen through the GeCl$_4$ and POCl$_3$ liquid is continuously decreased to yield a soot layer of radially decreasing GeO$_2$ and P$_2$O$_5$ content. The reduction in oxygen flow through the GeCl and POCl$_3$ is obtained by means of a cam profile being selected to produce the desired ultimate composition gradient. Control means such as that disclosed in U.S. Pat. No. 3,826,560 is employed to vary the flow of liquid constituents. A composite structure 6 inches long and 1.5 inch in diameter and having a radially varying composition is deposited in about 2 hours. This soot will form the core of the resultant optical waveguide and has an axial refractive index of 1.49 measured at 589.3 nm. As the outside portion of the first soot layer is reached, the flow rate of gas through the POCl$_3$ and GeCl$_4$ is ceased, and a 0.3 liter per minute flow of BCl$_3$ is supplied to the flame hydrolysis flame. The initial 2 liter per minute flow of oxygen through the liquid SiCl$_4$ is continued. A layer of soot consisting of 20 wt. percent B$_2$O$_3$ and 80 wt. percent SiO$_2$ is then deposited on the first soot layer. After consolidation, this second soot layer forms a layer of cladding glass having a refractive index of about 1.458. When the diameter of the blank reaches about 2.5 inches, the flow of all gases and vapors are stopped and the soot blank thus formed is cooled to room temperature. The starting rod is removed from the blank which is then sintered in a furnace having a helium atmosphere at about 1000° C. The resultant redraw blank is placed in an induction furnace and is drawn in an oxygen atmosphere at about 1150° C. As the structure is drawn, it decreases in diameter, and the central hole collapses. Drawing is continued until the final desired waveguide dimensions are obtained. An optical waveguide of this example may be drawn to an outside diameter of 5 mils.

We claim:

1. An optical fiber comprising
a cladding layer formed of high purity glass, and
a core of high purity glass containing an amount of P$_2$O$_5$ and GeO$_2$ to provide a refractive index greater than that of said cladding layer, said core glass having a cation impurity level not exceeding 10 parts per million of transition elements.

2. The fiber of claim 1 wherein said core essentially consists of P$_2$O$_5$ and GeO$_2$.

3. The fiber of claim 1 wherein said cladding layer contains an amount of B$_2$O$_3$ such that the expansion coefficient of said cladding layer is less than that of said core by an amount between 0 and $15 \times 10^{-7}$ per °C.

4. The fiber of claim 3 wherein the softening temperature of said core glass is less than that of said cladding layer by up to about 50° C.

5. The fiber of claim 1 wherein said core has a gradient refractive index.

6. The fiber of claim 1 wherein said core has a substantially constant refractive index.

7. The fiber of claim 1 wherein said core glass comprises P$_2$O$_5$, GeO$_2$ and SiO$_2$ and said cladding glass layer comprises B$_2$O$_3$ and SiO$_2$, said core containing an amount of P$_2$O$_5$ that is sufficient to reduce the softening temperature of said core glass to a value which is less than that of said cladding glass by an amount between 0° and 50° C., and said cladding layer having an amount of B$_2$O$_3$ that is sufficient to increase the expansion coefficient of said cladding layer to a value less than that of said core glass by an amount between 0 and $15 \times 10^{-7}$ per °C.

8. The fiber of claim 1 wherein the amount of P$_2$O$_5$ present in said core glass is about 40-60 wt.% of the total amount of P$_2$O$_5$ and GeO$_2$ present therein.

9. The fiber of claim 8 wherein the amount of SiO$_2$ present in said core glass is up to 70 wt.%.

10. An optical waveguide comprising a core of glass formed of phosphorous pentoxide, germania and silica and a cladding of a glass of a lower refractive index than the core.

11. The optical waveguide of claim 10 in which the cladding comprises a borosilicate glass.

12. The optical waveguide of claim 10 wherein said core has a gradient refractive index.

13. An optical waveguide fiber comprising a glass core surrounded by a cladding of glass having a refractive index less than that of said core glass, said core glass comprising SiO$_2$ and GeO$_2$, said core glass including P$_2$O$_5$ in an amount sufficient that the softening point temperature of said core glass is less than that of said cladding glass.

14. An optical waveguide fiber in accordance with claim 13 wherein said core glass includes P$_2$O$_5$ in an amount sufficient that the softening point temperature of said core glass is less than that of said cladding glass by an amount between 0° and 50° C.

15. An optical waveguide fiber in accordance with claim 13 wherein said cladding glass comprises SiO$_2$ doped with B$_2$O$_3$.

16. An optical waveguide fiber in accordance with claim 15 wherein said core glass includes P$_2$O$_5$ in an amount sufficient that the softening point temperature of said core glass is less than that of said cladding glass by an amount between 0° and 50° C.

17. An optical waveguide fiber in accordance with claim 16 wherein said cladding glass comprises SiO$_2$ doped with a sufficient amount of B$_2$O$_3$ to increase the coefficient of expansion thereof to a value which is up to $15 \times 10^{-7}$ per °C. lower than that of said core glass.

18. An optical waveguide fiber in accordance with claim 13 wherein said cladding glass comprises SiO$_2$ doped with a sufficient amount of B$_2$O$_3$ to increase the coefficient of expansion thereof to a value which is up to $15 \times 10^{-7}$ per °C. lower than that of said core glass.

* * * * *

UNITED STATES PATENT AND TRADEMARK OFFICE
CERTIFICATE OF CORRECTION

PATENT NO. : 4,339,173

DATED : July 13, 1982

INVENTOR(S) : Ishwar D. Aggarwal et al

It is certified that error appears in the above-identified patent and that said Letters Patent is hereby corrected as shown below:

Column 16, line 41, "16" should read -- 13 --.

Signed and Sealed this

Ninth Day of April 1985

[SEAL]

Attest:

DONALD J. QUIGG

Attesting Officer

Acting Commissioner of Patents and Trademarks